(12) United States Patent
Schmidt et al.

(10) Patent No.: US 8,511,872 B2
(45) Date of Patent: Aug. 20, 2013

(54) PREDICTIVE ADAPTIVE FRONT LIGHTING FOR A MOTOR VEHICLE

(75) Inventors: Christoph Schmidt, Brühl (DE); Dömötör Gulyas, Köln (DE)

(73) Assignees: Varroccorp Holding BV (NL); Varroc Engineering Private Limited (IN); Varroc Lighting Systems S.R.O. (CZ)

(*) Notice: Subject to any disclaimer, the term of this patent is extended or adjusted under 35 U.S.C. 154(b) by 99 days.

(21) Appl. No.: 13/207,583

(22) Filed: Aug. 11, 2011

(65) Prior Publication Data

US 2012/0044708 A1 Feb. 23, 2012

(30) Foreign Application Priority Data

Aug. 17, 2010 (DE) .................. 10 2010 039 399

(51) Int. Cl.
*B60Q 1/00* (2006.01)
*G06F 7/00* (2006.01)

(52) U.S. Cl.
USPC ........... 362/466; 362/507; 362/464; 362/465; 362/37; 701/49

(58) Field of Classification Search
USPC ............... 362/37, 464, 465, 507; 701/49, 701/207; 340/990
See application file for complete search history.

(56) References Cited

U.S. PATENT DOCUMENTS

| | | | |
|---|---|---|---|
| 2007/0052555 A1* | 3/2007 | Ibrahim | ............ 340/990 |
| 2007/0198156 A1 | 8/2007 | Yamada | |
| 2007/0250263 A1 | 10/2007 | Yamada | |
| 2008/0262681 A1 | 10/2008 | Morishita et al. | |
| 2009/0105912 A1 | 4/2009 | Horii et al. | |

FOREIGN PATENT DOCUMENTS

| | | |
|---|---|---|
| DE | 19755406 C2 | 7/2001 |
| DE | 10164193 A1 | 7/2002 |
| DE | 10163004 A1 | 9/2002 |
| DE | 10240633 A1 | 3/2003 |
| DE | 19756574 C2 | 11/2003 |
| DE | 10347552 A1 | 5/2005 |
| DE | 102005038581 A1 | 3/2007 |
| DE | 102006048398 A1 | 4/2007 |
| DE | 102007007467 A1 | 8/2008 |
| DE | 102008000768 A1 | 10/2008 |
| DE | 102008000769 A1 | 11/2008 |
| EP | 1234717 A2 | 8/2002 |
| EP | 1595740 A2 | 11/2005 |
| EP | 1927822 A1 | 6/2008 |
| EP | 1964717 A2 | 9/2008 |
| EP | 2119593 A1 | 11/2009 |
| EP | 2138349 A2 | 12/2009 |
| WO | 2006111291 A1 | 10/2006 |
| WO | 2009053457 A1 | 4/2009 |

* cited by examiner

*Primary Examiner* — Ali Alavi
(74) *Attorney, Agent, or Firm* — Cantor Colburn LLP (57) ABSTRACT

The present invention relates to a method for operating a predictive adaptive front lighting for a vehicle with headlamps and a controller. The method includes the steps of receiving a vehicle position; identifying a map location of the vehicle; determining a most likely path of the vehicle based on the map location; locating a target point on the most likely path of the vehicle; adaptively changing a distance between the vehicle and the target point; calculating a desired swivel angle for the vehicle headlamps based on the most likely path of the vehicle; and swiveling the headlamps according to the desired swivel angle.

9 Claims, 8 Drawing Sheets

PREDICTIVE ADAPTIVE FRONT LIGHTING FOR A MOTOR VEHICLE

CROSS-REFERENCE TO RELATED APPLICATION

The present application claims priority to German Patent Application Serial No. DE 10 2010 039 399.1 filed Aug. 17, 2010, the entire disclosure of which is hereby incorporated herein by reference.

FIELD OF INVENTION

The present invention relates to a method for predictive adaptive front lighting of a motor vehicle with headlamps, which cooperatively project a beam pattern, and a controller. The headlamps each are coupled to a swivel mechanism for changing a swivel angle. The optimal setting of the beam pattern projected by the headlamps is determined based on data of the upcoming road, or the road path in front of the vehicle to be used next. The controller identifies a map location of the vehicle to determine a most likely path of the vehicle and then, based on the determined most likely path calculates a desired swivel angle of the headlamps.

BACKGROUND OF THE INVENTION

In prior art, adaptive front lighting systems (further also referred to as AFS) of motor vehicles are known where the swivel angles of the headlamps are determined based on the values of the steering wheel angle and the vehicle speed. Accordingly, the swivel angles are only based on the sensed instantaneous path of the vehicle. In some drive scenarios, however, such as just before the vehicle enters or exits a curve, or during passing a curve with a changing radius of curvature, or having an S-shaped curvature, the instantaneous vehicle path sensed in this way is not entirely indicative of the road path in front of the vehicle. It is particularly advantageous for the performance of the headlamps to predictively illuminate the upcoming road in drive scenarios when the road varies from the current vehicle path.

Generic AFS systems that predictively calculate upcoming vehicle path data to optimally manipulate the beam pattern of the headlamps include at least two headlamps, each with a swivel mechanism and a controller. The headlamps cooperatively project a beam pattern for illumination of the road upcoming in front of the vehicle. The swivel mechanisms change the respective swivel angle of each headlamp.

Therefore, the AFS systems of prior art, which for manipulating the headlamps are based only on the steering wheel angle and the vehicle speed, are characterized in that the headlamps cannot be swiveled into the position that is optimal for the future vehicle path, but illuminate the area immediately in front of the vehicle so that even glare for the oncoming traffic may be created. Even if the instantaneous measurement is filtered and dead zones are applied to overcome any jittering in the steering angle measurement resulting from the lane adjustments by the driver, the illumination will still not be optimal. Moreover, filtering and dead zoning operations delay performance of a conventional AFS.

Further developments of the AFS resulted in systems that swivel the headlamps already before the vehicle enters the curve so that the visibility of the upcoming curve is improved. Also, the headlamps are swiveled back into the initial position, i.e. the straight ahead position already during exiting the curve so that the upcoming straight segment of the road is visible better. In this way, glare for the oncoming traffic is avoided in each case, but illumination of the road is not optimal.

Similarly, unfavorable illuminations of the road result when passing S-shaped roads or changing the lane. When passing S-curves, it is necessary to swivel the headlamps in the direction of the upcoming curve before the saddle point of the S-curve is reached so that the visibility of the upcoming curve is improved.

Such a further developed predictive adaptive front lighting system for a motor vehicle, for example, is disclosed by DE 10 2008 000 769 A1. Here, the controller of the system receives vehicle position data from, for example, a GPS system as well as data that relate to a most likely path and a secondary path of the vehicle, and therefrom calculates the desired swivel angles of the headlamps. Based on the values of the swivel angles of each headlamp, the swivel mechanisms cause the headlamps to be appropriately moved.

The controller accesses a map database and uses the vehicle position data to identify the map location of the vehicle. Then, the controller analyzes the map to determine a most likely vehicle path, based on the map location and vehicle heading parameters. The controller then calculates the desired swivel angles of the headlamps based on the calculated most likely path geometry data and if necessary, causes the swivel angles to be changed, i.e. the headlamps to be oriented such that the run of the road determined as the most likely vehicle path is illuminated.

The beam pattern produced in this way includes a defined kink point, whereby the controller determines the kink point position relative to the most likely path. The controller is established to calculate a nominal swivel angle such that the kink point will be at a predefined distance from the center of the vehicle's lane of operation.

In addition, the controller calculates a maximum swivel angle of the headlamps that does not create glare for the oncoming traffic so that the desired swivel angle is determined based on the maximum swivel angle and the nominal swivel angle.

In the predictive adaptive front lighting system disclosed by DE 10 2008 000 769 A1 the beam is directed to a point located on the vehicle path at a constant distance in front of the vehicle. This point is determined based on the geometrical description of the immediately upcoming segment of the road, starting from the current vehicle position.

It is possible, however, that dependent on the altitude profile of the road environment and possible obstacles in form of crash barriers, buildings, trees or the like, the beam pattern resulting from the AFS is obstructed. No optimal road illumination can be obtained due to shadowing resulting therefrom.

It is the problem of the invention to provide an improved method for operating a predictive adaptive front lighting system for a motor vehicle that ensures an optimal road illumination also when the altitude profile of the road environment varies and there are obstacles within the road environment.

SUMMARY OF THE INVENTION

The problem is solved by a method for operating a predictive adaptive front lighting system for a motor vehicle, further also referred to as PAFS. The PAFS includes first and second headlamps configured to cooperatively project a beam pattern. The headlamps each are coupled to a swivel mechanism for changing a respective swivel angle of the headlamp. Further the PAFS includes a controller.

According to the invention, the method for a predictive adaptive front lighting system for a motor vehicle includes the steps of receiving a vehicle position, determining a map position of the vehicle, and determining a most likely path of the vehicle, with the path determination based on the map position.

According to a concept of the invention, a target point is positioned on the most likely driving path of the vehicle and the distance between the vehicle and the target point is adaptively changed. Thus, the target point is dynamic. The position of the target point is variable and dynamically adjusted.

In the method, a desired swivel angle of a headlamp is calculated based on the most likely path of the vehicle. Then, the headlamp is swiveled according to the calculated desired swivel angle.

So, the invention includes a control strategy for a PAFS relative to a single path using an adaptive dynamic target point.

The adaptive change of the distance between the vehicle and the target point is advantageously based on the road geometry and the vehicle speed.

According to an embodiment of the method according to the invention, the speed of changing the distance between the vehicle and the target point is adaptively changed dependent on the road geometry and vehicle speed. That means that the speed of changing the distance is variably adaptable.

The desired swivel angle and a nominal swivel angle of a headlamp are preferably calculated such that the target point is at a predefined distance to the center of a host vehicle's lane of operation. In addition, in the method a maximum swivel angle of a headlamp is calculated such that no glare for the oncoming traffic is created. The calculation is preferably based on the nominal swivel angle and the maximum swivel angle.

In addition, the desired swivel angle is advantageously calculated based on a curvature of the most likely path.

According to a further embodiment of the method according to the invention, the first and second headlamps are swiveled in curve passing scenarios, whereby the headlamps within a curve entry scenario are swiveled back into a straight ahead position starting before a curve and within a curve exit scenario are swiveled starting before the end of the vehicle's cornering, that is before the end of the curve.

In S-curve scenarios, swiveling of the headlamps advantageously starts before the saddle point in a direction of the upcoming curve.

In addition to swiveling the headlamps of the PAFS to avoid glare for the oncoming traffic and improve the visibility of the upcoming road in front of the vehicle in curves and on straight road segments following curves, it is particularly advantageous, preferably in combination with the curve illumination, to switch on and off lamps that are additionally provided at the vehicle. Particularly, the additional lamps serve to better illuminate side regions of the vehicle.

According to a further embodiment of the invention, as the target point, a kink point of a beam pattern is used relative to the most likely vehicle path. Here, the beam pattern is cooperatively projected by a first headlamp and a second headlamp.

The solution according to the invention has diverse advantages: improved illumination of the road, hence improved drive comfort; light guiding for the driver—illuminating the road, the adaptive light shows the driver the path; and high safety when driving in the darkness.

BRIEF DESCRIPTION OF THE DRAWINGS

Further objects, features and advantages of this invention will become readily apparent to persons skilled in the art after a review of the following description of examples of embodiment, with reference to the drawings. It is shown by FIG. 1 is a schematic diagram of a predictive adaptive front lighting system for a motor vehicle.

DETAILED DESCRIPTION OF EXEMPLARY EMBODIMENTS OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
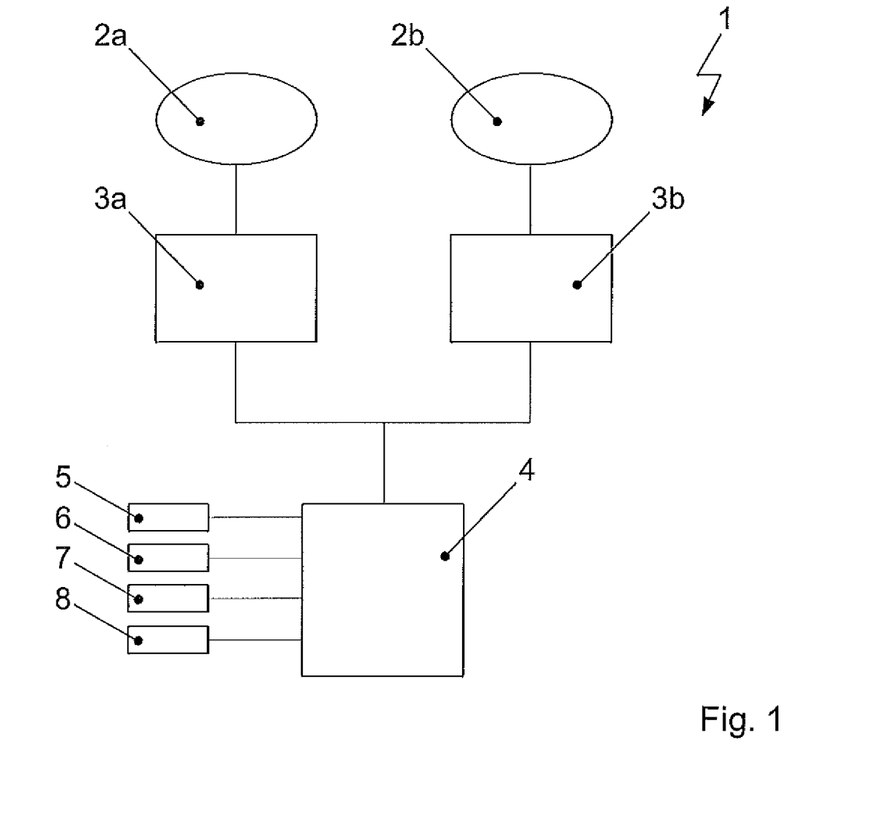

Referring now to FIG. 1, a predictive adaptive front lighting system for a motor vehicle is illustrated herein and generally designated at 1. The PAFS 1 includes a first headlamp 2a, a second headlamp 2b, a first swivel mechanism 3a, a second swivel mechanism 3b, and a controller 4. The controller 4 receives input from one of the elements: a GPS 5, a yaw rate sensor 6, a vehicle speed sensor 7, and a map database 8. The controller 4 is configured to predict a most likely vehicle path based on the map database 8 and the various inputs from the GPS 5, the yaw rate sensor 6, and/or the vehicle speed sensor 7. Based on the predicted path, the controller 4 manipulates the first and second swivel mechanisms 3a, 3b to respectively direct the first and second headlamps 2a, 2b for illumination of the predicted vehicle path. The first and second swivel mechanisms 3a, 3b may take many forms, including, for example, a linear drive that is attached to one side of the headlamp causing it to swivel about a pivot point or a drive for direct rotational control. The swivel mechanisms 3a, 3b manipulate a projected position of a beam pattern from the headlamps 2a, 2b in front of the vehicle. This manipulation may be in a plane or in more than one plane.

The controller 4 predicts the upcoming vehicle path, assuming a single path, to optimally swivel the beam pattern of the headlamps 2a, 2b. In many scenarios, the current vehicle heading or steering parameters may not accurately indicate a future vehicle path and/or an optimal beam pattern for the driver.

Figure 2A:
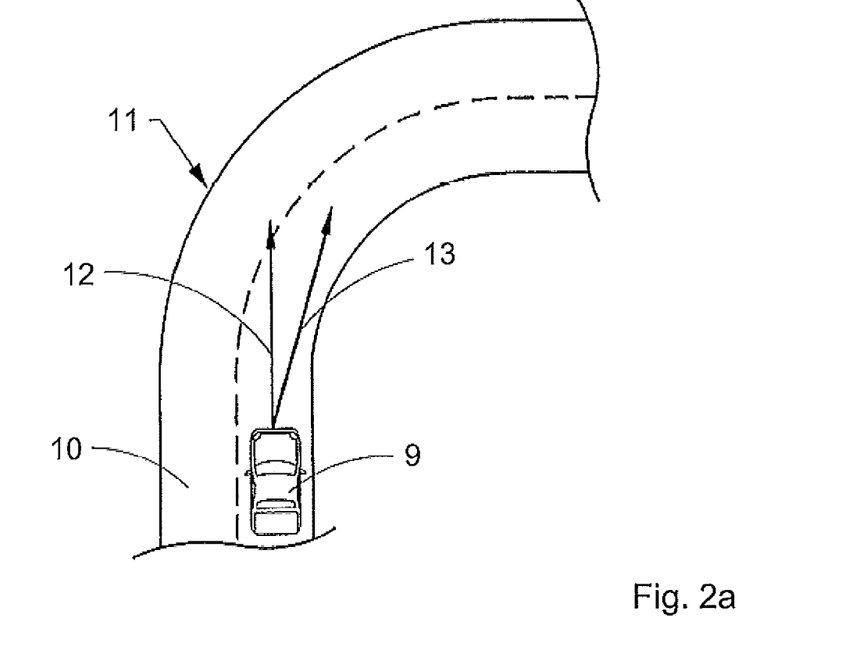
FIG. 2a is a schematic diagram showing a curve entry scenario.

In the scenarios shown in FIGS. 2a to 2d, a conventional AFS system fails to swivel the headlamps to the optimal position for the future vehicle path. In FIG. 2a, a curve entry scenario is shown. In this scenario, a vehicle 9 is driven on a straight road 10 just prior to a curve 11. The vehicle yaw, as well as a steering wheel angle, would seem to indicate that the vehicle path would be straight in front of the vehicle 9, as denoted by arrow 12. Accordingly, a conventional AFS would illuminate the area directly in front the vehicle 9. This may cause the headlamps to glare at oncoming traffic. However, it is desirable for the headlamps 2a, 2b to start to swivel ahead of the curve 11 in the upcoming direction of drive, as denoted by arrow 13, to improve a visibility of the curve 11 ahead and to avoid glare for the oncoming traffic.

Figure 2B:
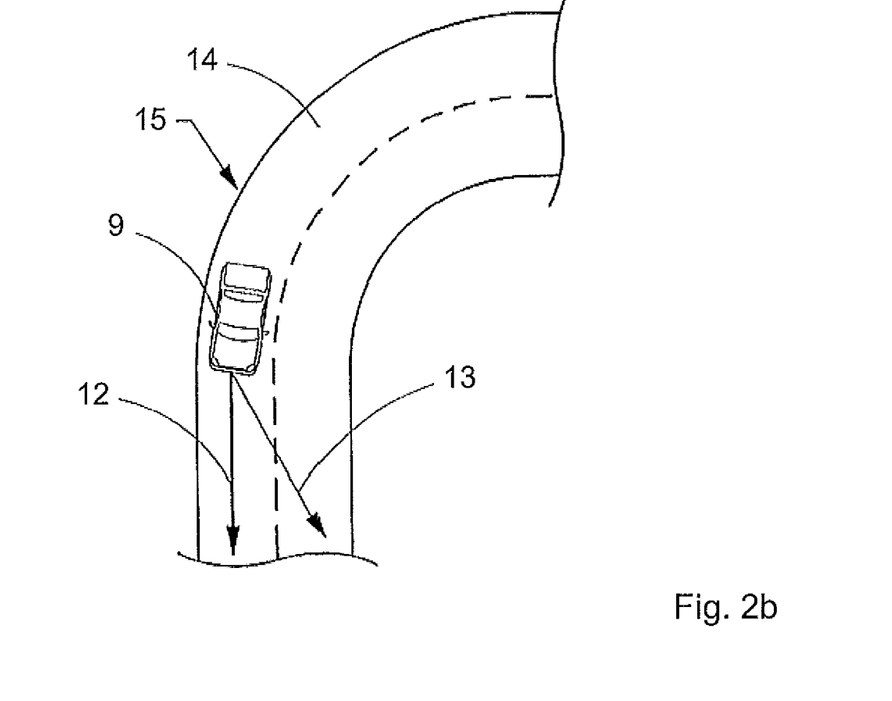
FIG. 2b is a schematic diagram showing a curve exit scenario.

In FIG. 2b, a curve exit scenario is shown where the vehicle 9 is driven on a curved road 14 just prior to exiting a curve 15. The vehicle yaw, as well as the steering wheel angle, indicate that the vehicle 9 is currently turning at a given turn angle. Accordingly, a conventional AFS would illuminate an area in front of the vehicle 9 but offset by the turn angle, as denoted by arrow 13. It is desirable in this scenario that the headlamps 2a, 2b start to swivel back in the upcoming direction of drive, as denoted by arrow 12, that is to the straight position before the end of the curve 15 to improve the visibility of the straight road segment ahead and to avoid glare for the oncoming traffic.

Figure 2C:
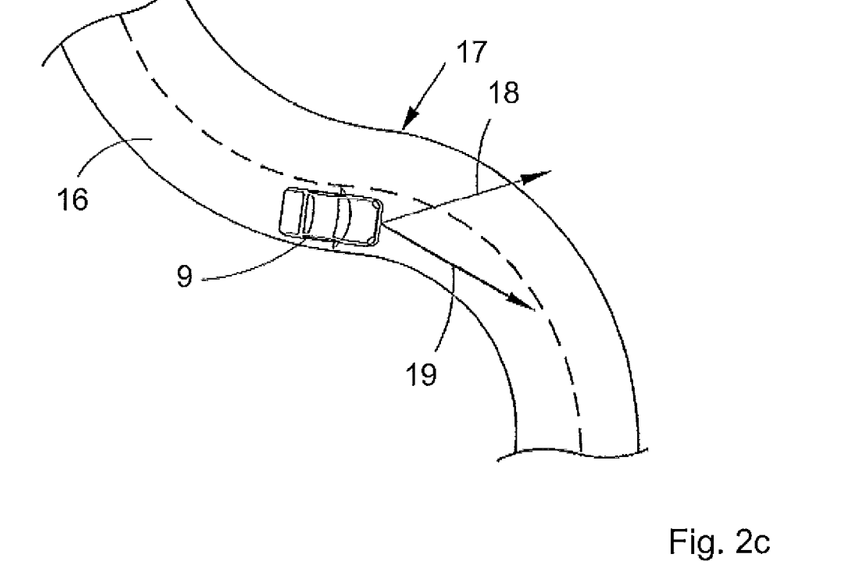
FIG. 2c is a schematic diagram showing an S-curve scenario.

In FIG. 2c, an S-curve scenario is shown. Here, the vehicle 9 is driven on a road 16 through an S-curve 17. The vehicle yaw, as well as the steering wheel angle, indicate that the vehicle 9 is currently turning at a given turn angle. Further, the yaw rate indicates the vehicle 9 is turning to the left. Accordingly, a conventional AFS would illuminate the area in front of the vehicle 9 but offset to the left by the turn angle, as denoted by arrow 18. Not only would the headlamps 2a, 2b glare into the oncoming traffic, but the headlamps 2a, 2b would provide illumination that is directed to the left of the vehicle 9, whereas the future vehicle path is to the right of the vehicle. Therefore, it is desirable that the headlamps 2a, 2b start to swivel before the saddle point of the S-curve 17 in the upcoming direction of drive, as denoted by arrow 19, to improve the visibility of the curve segment ahead and to avoid glare for the oncoming traffic.

Figure 2D:
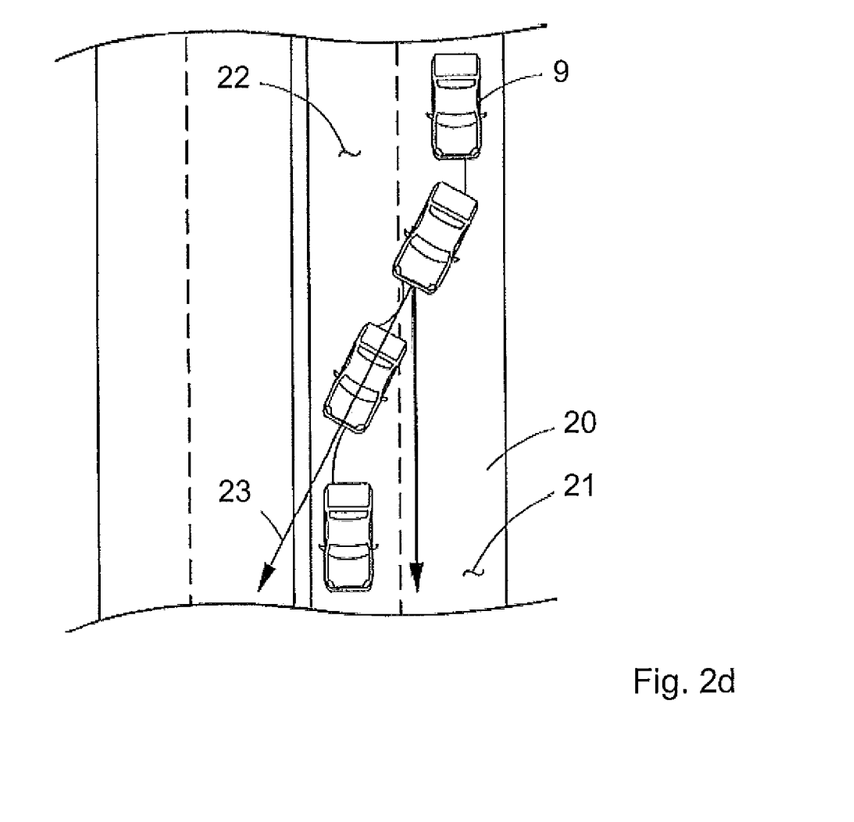
FIG. 2d is a schematic diagram showing a lane change scenario.

A lane change scenario is shown in FIG. 2d. At the start of the scenario, the AFS keeps the beam pattern of the headlamps parallel to the road, while the vehicle 9 is driven along a straight segment of road 20 and changes from a first lane 21 to a second lane 22. The vehicle yaw, as well as the steering wheel angle, indicate that the vehicle 9 is currently turning at a given turn angle, as denoted by arrow 23. The general path of the vehicle 9, however, is straight ahead.

The conventional AFS cannot achieve the above desired performances because it uses the instantaneous (at the vehicle current vehicle position) steering angle and vehicle speed measurements to manipulate the headlamps 2a, 2b. Even if the instantaneous measurement is filtered and dead zones are applied to overcome any jittering in the steering angle measurement resulting from the lane adjustments by the driver, the illumination of the area just before the vehicle 9 will still not be optimal. Filtering and dead zoning operations delay performance of a conventional AFS in the above road scenarios. Moreover, conventional AFS performance is negatively affected by many typical driving behaviors, for example, lane changes. It is useful that the headlamps 2a, 2b do not remain in the straight position in the lane change scenario.

Figure 3:
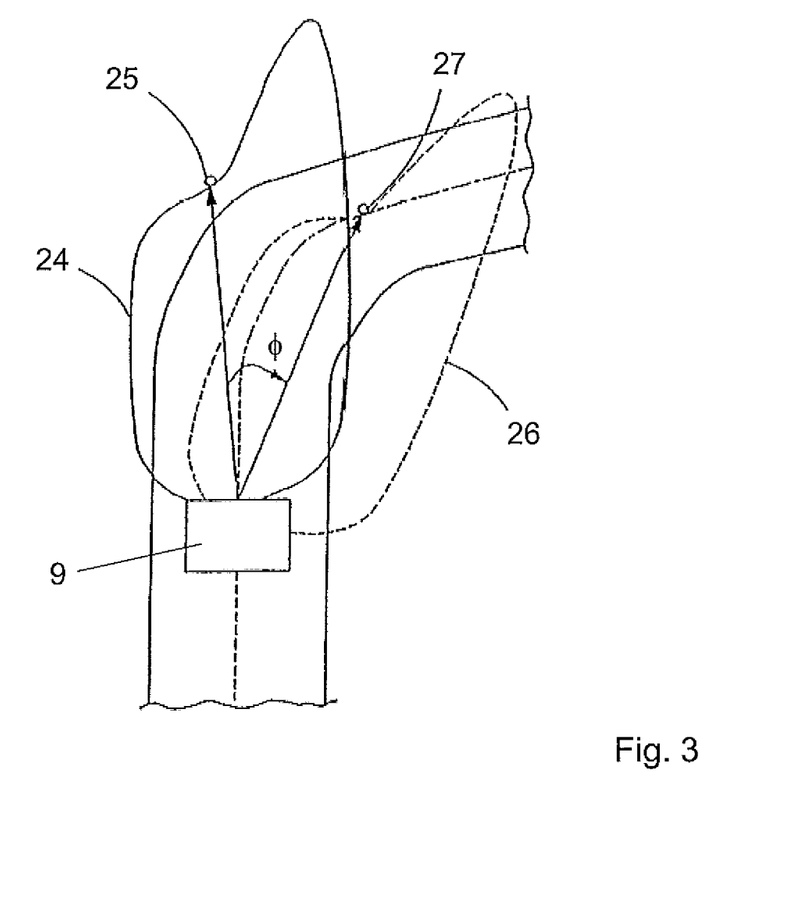
FIG. 3 is a schematic diagram showing an effect of a swivel angle of headlamps on a beam pattern.

FIG. 3 shows, in the curve entry scenario, a first projected beam pattern 24 for a conventional AFS (in this scenario) and a second projected beam pattern 26 of the PASF 1. The first beam pattern 24 has a kink point 25 formed by the overlapping patterns from the first and second headlamps 2a, 2b. A kink point 25 is an inflection point in the low beam and may have a luminance value of around 1 Lux, for example. Further, the kink point 25 may be the location in the low beam where a longitudinal axis of the vehicle intersects with the line of intersection between the high and the low beams. Advantageously, the kink point 25 is located substantially in the center of the desired illumination area. Similarly, the second beam pattern 26 has a kink point 27. The PAFS 1 swivels the beam of the headlamps 2a, 2b by an angle φ, such that the beam kink point 27 of the beam pattern 26 is substantially in the middle of a lane of the host vehicle, that is, the lane occupied by the vehicle 9 equipped with the PAFS 1. The PAFS 1 utilizes an algorithm that calculates the upcoming path data, such as curvature data, along the predicted vehicle path. The PAFS 1 is configured to achieve an optimal visibility for travel in the lane of the host vehicle, under the constraint that a glare is minimized, to the extent possible, for oncoming traffic.

Unfortunately, turns in roads do not have a constant curvature. As a result, swiveling a constant shape headlamp beam pattern to optimally cover the lane of the host vehicle can be challenging without glaring the oncoming traffic or increasing the visibility on one part of the lane at the expense of the other part. Further, a geometry of some roads may pose particular challenges. For example in an S-curve road geometry, the sign, or the direction, respectively, of the curvature changes quickly over a relatively short distance. Similar challenges arise when the vehicle changes lanes.

Figure 4:
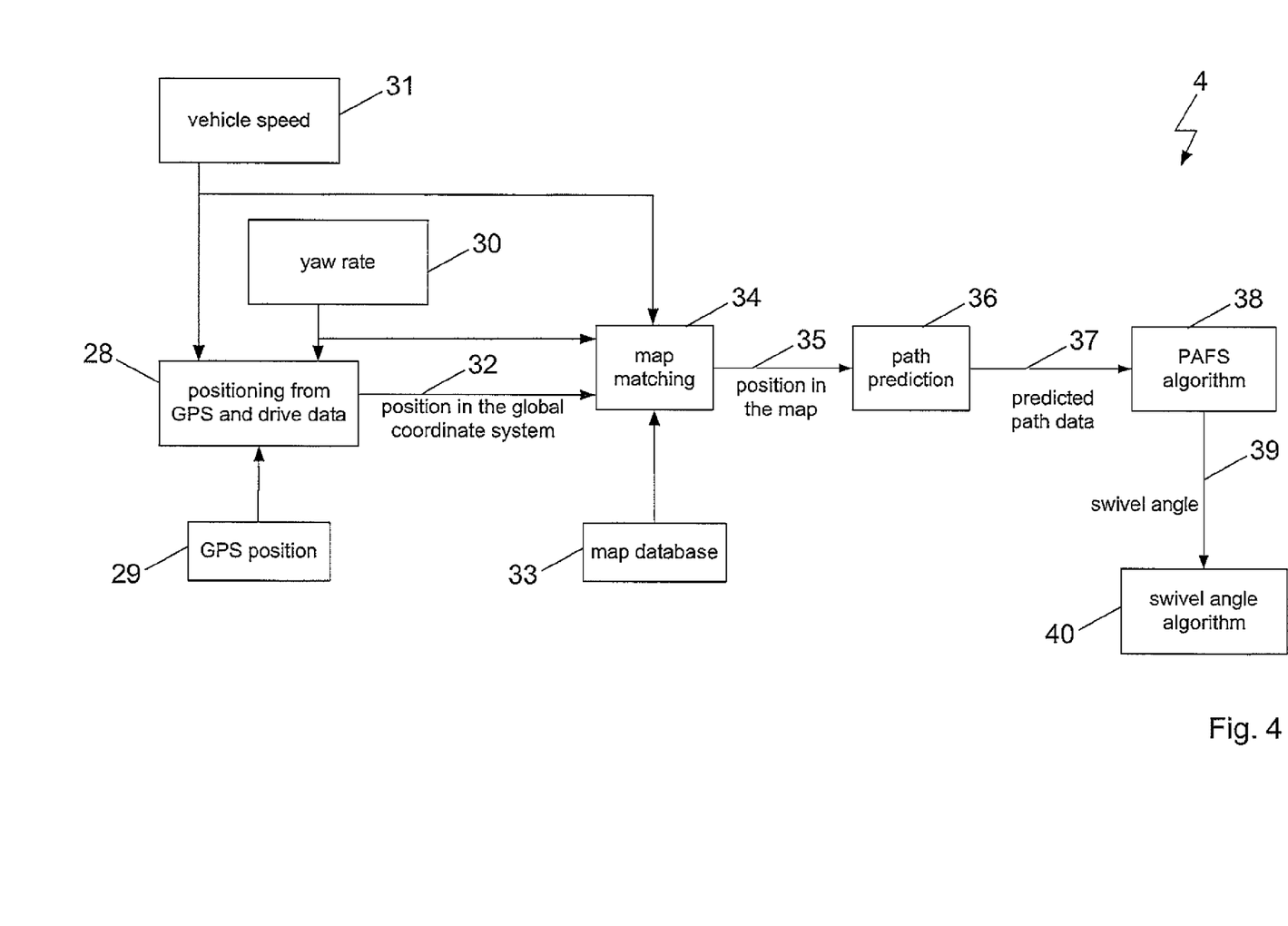
FIG. 4 is a block diagram of a method for determination of a desired swivel angle.

FIG. 4 shows a block diagram that is used by the controller 4 in controlling the swivel mechanisms 3a, 3b of the headlamps 2a, 2b, in accordance with the present invention. In block 28, the GPS position from block 29 is augmented with a yaw rate measurement from block 30, and a speed measurement from block 31. The GPS position, the yaw rate, and/or the speed of the vehicle are used to calculate the vehicle position 32 in a global coordinate system. Using the map database 33, a map-matching algorithm 34 identifies a calculated vehicle position 35 on a map. A path prediction algorithm 36 analyzes the map relative to the calculated position and the direction of travel of the vehicle. The path prediction algorithm 36 calculates a candidate list of probable intended driving paths. From the list, the path prediction algorithm 36 determines a most likely path by associating confidence scores to each of the intended driving paths on the candidate list. Once the most likely path (MLP) is determined, the path prediction algorithm 36 calculates a curvature of the MLP. A path data 37, including the resultant curvature values, are provided to the PAFS algorithm 38. The PAFS algorithm 38 uses the calculated path data 37 in order to determine a desired swivel angle 39 for each of the headlamps 2a, 2b. The desired swivel angles 39 are respectively provided to the swivel mechanisms 3a, 3b, as denoted by block 40.

Figure 5:
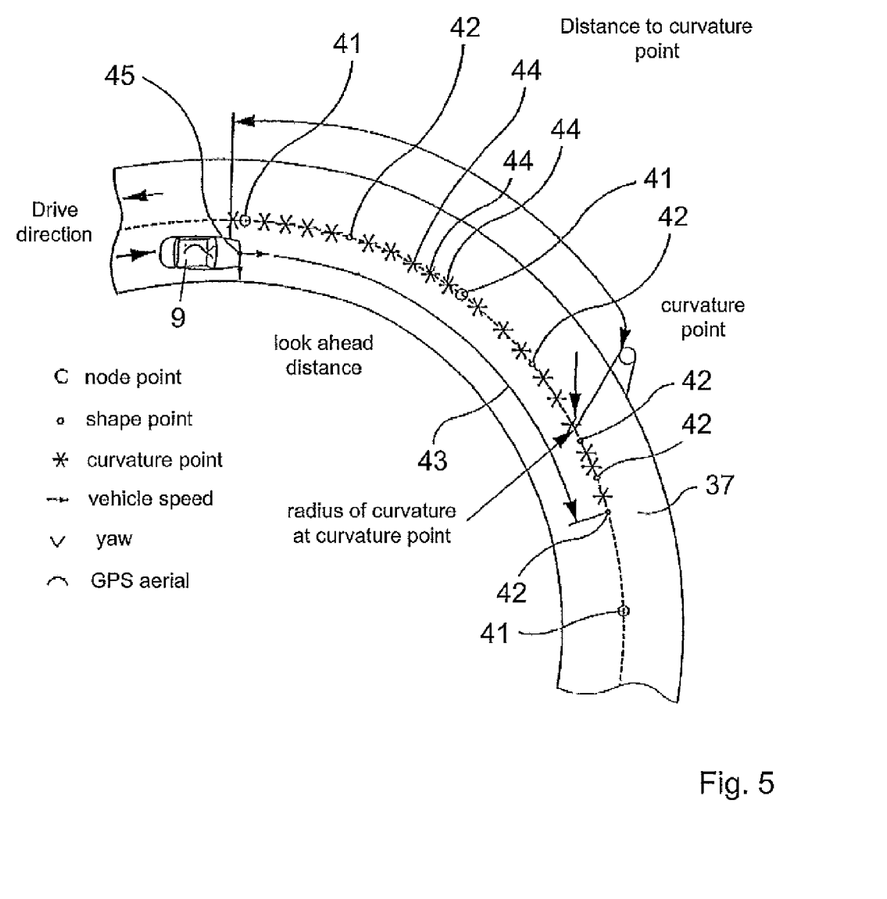
FIG. 5 is a graphical representation of a vehicle path map data.

FIG. 5 shows a geometric representation of the path data 37. The geometric representation in the map database 33 is based on node points 41 and shape points 42. Every road segment in the map starts and ends with a node point 41. The shape points 42 are located between node points 41 to capture the road segment geometry. The path prediction algorithm 36 determines the most likely driving path and calculates the curvature at each of the shape points 42 and node points 41 within the range of a look ahead distance 43. The path prediction algorithm 36 also calculates the curvatures between shape points 42 based on a road model. In FIG. 5, as an illustrative example, twenty curvature points 44 span over the look ahead distance 43 and the associated distances of each curvature point 44 measured from a vehicle position 45 are provided to the PAFS algorithm 38. The PAFS algorithm 38 uses some of these twenty curvature points 44 and distance values to determine the optimal headlamp swiveling angle 39. The number of curvature points 44 in the representation can be varied as desired.

The path prediction algorithm 36 also provides, for example, in addition to the twenty curvature points 44 along the look ahead distance 43, other data such as a corresponding geometric distance, a travel distance, a coordinate position, and a vehicle heading angle, which for example, is measured from north.

In one embodiment, the beam pattern 26 can be deformed to follow the road geometry. In many implementations, however, the degree of freedom for shaping the beam pattern 26 is not sufficient to achieve such deformation so that some solutions may be sub-optimal. One approach is based on placing the kink point 27, shown in FIG. 2, at a desired lateral distance from the center of the lane of the host vehicle, whereby this approach, however, is subject to the constraint that glare is minimized and visibility is substantially uniformly distributed on the host vehicle lane.

Accordingly, the typical steps in operating a single path PAFS are: Calculate the nominal swiveling angle φ that will place the kink point 27 at a lateral distance D from the center of the lane of the host vehicle; Calculate the maximum swiveling angle that can be used without creating glare to the oncoming traffic or badly affecting the visibility distribution; and Calculate the desired swivel angle 39 as the minimum of the nominal swiveling angle φ and the maximum swiveling angle in the absolute sense or a weighted average of nominal swiveling angle φ and maximum swiveling angle.

Figure 6:
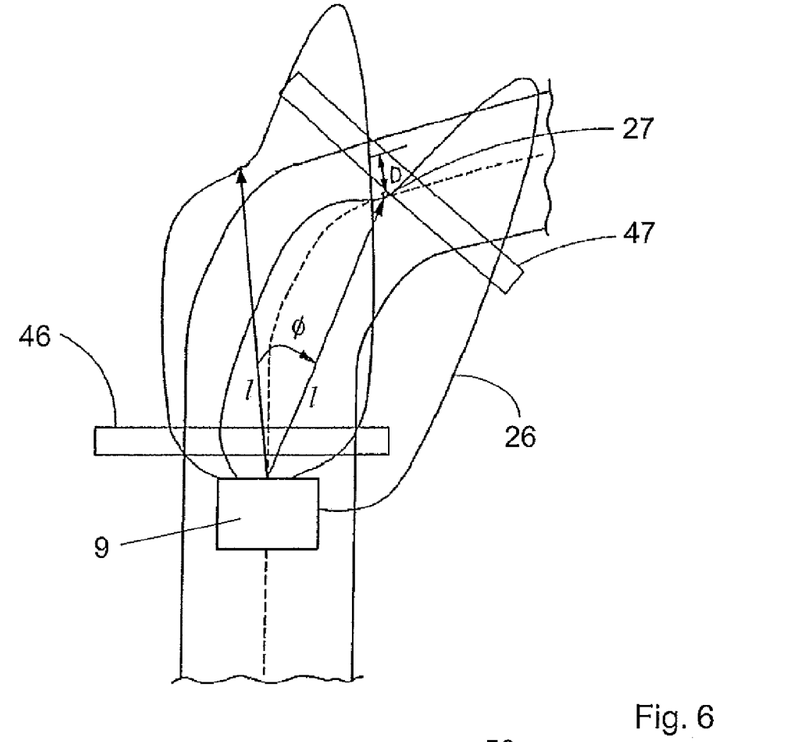
FIG. 6 is a schematic diagram showing a calculation of the desired swivel angle.
Figures 7A, 7B:
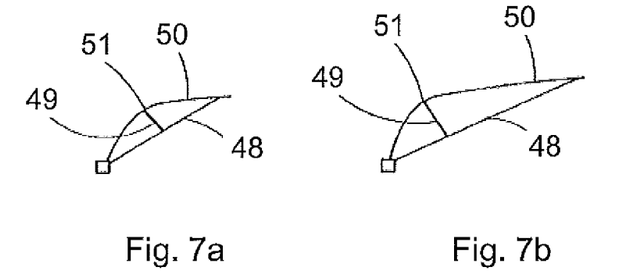
FIGS. 7a-7d are schematic diagrams showing a maximum deviation point for various curved scenarios.
Figure 7C:
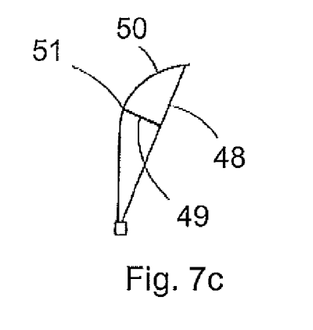
Figure 7D:
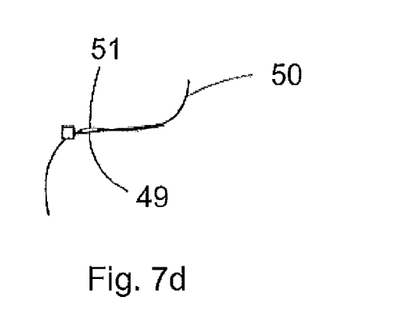

The calculation of the angle φ is based on the curvature and the distance data. As shown in FIG. 6, the beam pattern 26 spans over a road segment with a non-constant radius of curvature. Even though the path prediction algorithm 36 thoroughly describes the curvature behavior between an area 46 and an area 47, it is assumed that the curvature is linearly changing between the area 46 and the area 47.

If the kink point 27 is to be placed at a lateral distance D that is to the left from the center of the road, the angle φ can be approximately related to a heading angle of the vehicle 9 with respect to the road, a geometric distance I between the vehicle 9 and the kink point 27, and the curvature of the road. D is a predefined lateral distance from the center of the host lane.

The calculation of the heading angle enables the PAFS algorithm 38 to compensate for driving behavior, for example, when performing a lane change. Using a conventional AFS, the swiveling direction of the beam pattern 26 of the headlamps 2a, 2b would follow the steering angle, and as a result, the oncoming traffic would be glared and the visibility of the road ahead would be reduced.

The lateral distance D represents a protection zone against the imperfect accuracy of the curvature values. For example, in the left curve scenario, it is desired to set the lateral distance D such that the kink point 27 will be placed to the outside part of the curve, to the right of the lane center. This will minimize the glaring effect due to any errors in the curvature values.

To improve uniformity in visibility along the vehicle path and avoid glare of the oncoming traffic, the maximum swivel angle is calculated. However, to guarantee that the visibility uniformity will not be negatively affected and that glare will be controllable, the following approach is utilized.

The controller 4 determines the curvature point between the area 46 and the area 47 where the vertical line that equally divides the beam pattern 26 with the beam pattern center line 48 has its maximum lateral deviation 49 from a center of the road 50, as illustrated in FIGS. 7a to 7d.

As can be noticed from FIGS. 7a to 7d, a point of maximum deviation 51 is always closer to the maximum of the curvatures at the area 46 and the area 47 if both curvatures have the same sign. Therefore, the point of maximum deviation 51 is approximated to be at a distance L.

Figure 8:
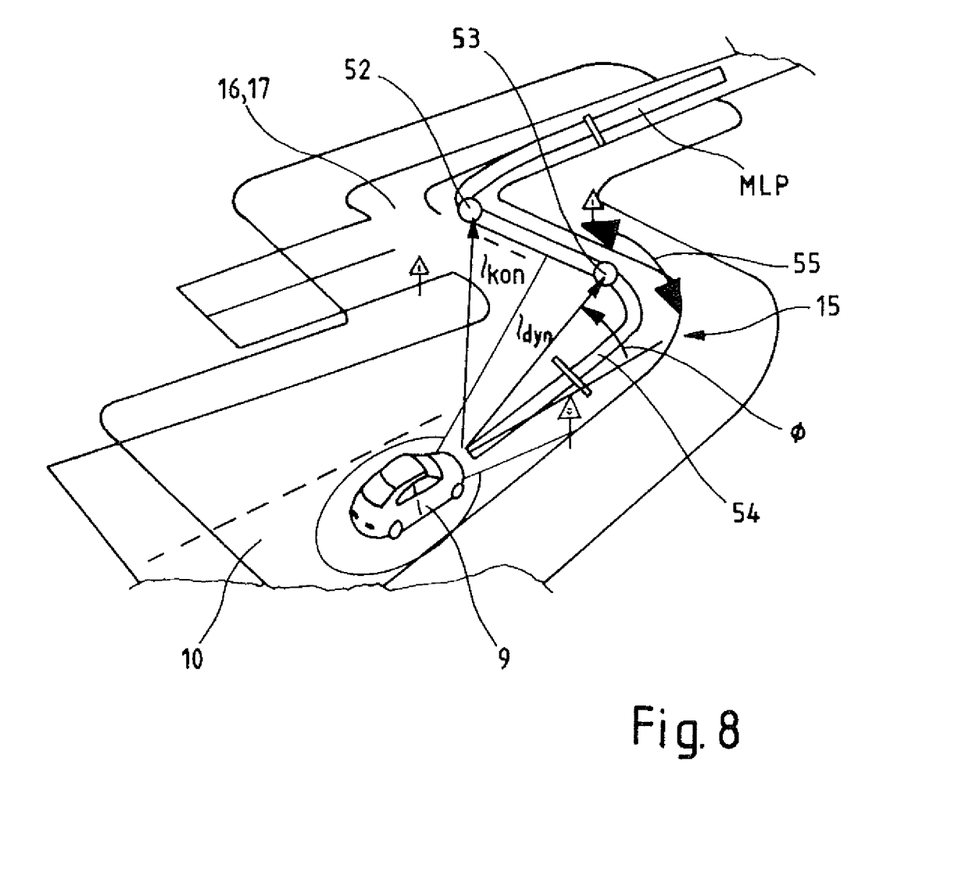
FIG. 8 is a schematic diagram showing a dynamic target point during curve drive.

FIG. 8 shows the predictive adaptive front lighting system 1 relative to a single path MLP using an adaptive dynamic target point 53, in accordance with the present invention.

The vehicle 9 is driven on a straight road 10 just prior to a curve 15. As described in FIG. 6, the calculation of the angle φ is based on curvature data and distance data of the road 16, or the most likely path MLP of the vehicle 9. With known PAFS, the geometric distance I from the target point 52 is given as constant value $I_{kon}$, with the value $I_{kon}$ in the range of 60 meters to 70 meters, with best results assumed to be 65 meters. Therefore, the target point 52 is also denoted as constant target point 52, or constant kink point 52 of the beam pattern of the vehicle 9.

According to the present invention, similar to the vision range of the driver of the vehicle 9, the distance I from the target point 53 for the illumination of the road 16 is adaptively changed. The distance $I_{dyn}$ from the target point 53 is varied dependent on the road geometry and the current vehicle speed.

When the vehicle 9 approaches the curve 15 with a very high curvature, that is a small radius, the distance $I_{dyn}$ between the vehicle 9 and the target point 53 is reduced down to a minimal distance. When the curved segment of the road 16 is left, the distance $I_{dyn}$ from the target point 53 is increased up to a maximum value.

Dependent on the current curvature at the target point 53, that is the road geometry, and the vehicle speed, the speed of changing the distance $I_{dyn}$ is also variably adapted, thus changed. Due to the different conditions in relation to the illumination possibilities of left- and right-hand curves or S-curves 17 as well as the entering and exiting the curves, all adaptations of the distance are individually adjustable.

Dependent on the road geometry ahead or curvature at the target point 53 and the vehicle speed, the position of the target point 53 in the defined area 54 is subject to a dynamic adaptation 55. Thus, the position of the target point 53 is adaptably variable.

From the foregoing description, one ordinarily skilled in the art can easily ascertain the essential characteristics of this invention and, without departing from the spirit and scope thereof, make various changes and modifications to the invention to adapt it to various usages and conditions.

| NOMENCLATURE | |
|---|---|
| 1 | predictive adaptive front lighting system, PAFS |
| 2a, 2b | headlamp |
| 3a, 3b | swivel mechanism |
| 4 | controller |
| 5 | GPS (global positioning system), global navigation satellite system |
| 6 | yaw rate sensor |
| 7 | vehicle speed sensor |
| 8 | map database |
| 9 | vehicle |
| 10 | straight road |
| 11 | curve |
| 12, 13 | arrow |
| 14 | curved road |
| 15 | curve |
| 16 | road |
| 17 | S-curve |
| 18, 19 | arrow |
| 20 | road |
| 21, 22 | driving lane |

-continued

| NOMENCLATURE | |
|---|---|
| 23 | arrow |
| 24, 26 | beam pattern |
| 25, 27 | kink point |
| 28...31 | block |
| 32 | vehicle position |
| 33 | map database |
| 34 | map matching algorithm |
| 35 | vehicle position |
| 36 | path prediction algorithm |
| 37 | path data |
| 38 | PAFS algorithm |
| 39 | swivel angle, desired swivel angle |
| 40 | block |
| 41 | node point |
| 42 | shape point |
| 43 | look ahead distance |
| 44 | curvature points |
| 45 | vehicle position |
| 46, 47 | area |
| 48 | beam pattern centerline |
| 49 | maximum lateral deviation |
| 50 | road |
| 51 | point of maximum deviation |
| 52 | constant target point/constant kink point |
| 53 | dynamic target point/dynamic kink point |
| 54 | region |
| 55 | dynamic adaptation |
| $\phi$ | angle, nominal swivel angle |
| D | lateral distance |
| I | distance from vehicle 9 to kink point 27 |
| MLP | most likely path/single path |
| $I_{kon}$ | constant value of distance I |
| $I_{dyn}$ | dynamic value of distance I, distance to dynamic target point |

What is claimed is:

1. A method of operating a predictive adaptive front lighting system for a vehicle with headlamps and a controller, the method including the steps of:
   Receiving a vehicle position;
   Identifying a map location of the vehicle;
   Determining a most likely path of the vehicle;
   Adaptively changing a distance between the vehicle and the target point;
   Calculating a desired swivel angle for the vehicle headlamps based on the most likely path of the vehicle; and
   Swiveling the headlamps according to the desired swivel angle, wherein the desired swivel angle is calculated such that the target point is at a first predefined distance to the center of a lane of the vehicle; wherein a nominal swivel angle of the headlamps is calculated such that the target point is at a second predefined distance to the center of the lane of the host vehicle; and wherein a maximum swivel angle of the headlamp is calculated such that no glare for oncoming traffic is created, with the calculation of the desired swivel angle being based on the nominal swivel angle and the maximum swivel angle.

2. The method according to claim 1, wherein the adaptive change of the distance between the vehicle and the target point is based on a road geometry and a speed of the vehicle.

3. The method according to claim 1, wherein a speed of changing the distance between the vehicle and the target point is adaptively changed dependent on a road geometry and a speed of the vehicle.

4. The method according to claim 1, wherein for an S-curve scenario, the swiveling the headlamps starts before the vehicle enters a saddle point of an S-curve.

5. The method according to claim 1, wherein as the target point, a kink point of a beam pattern is used with the beam pattern projected by a cooperation of a first one of the headlamps with a second one of the headlamps.

6. The method according to claim 1, wherein the desired swivel angle is calculated based on a curvature of the most likely path.

7. The method according to claim 1, wherein for a curve entry scenario, the swiveling the headlamps starts before the vehicle enters a curve.

8. The method according to claim 1, wherein for a curve exit scenario, the swiveling the headlamps starts before the vehicle exits a curve.

9. A method of operating a predictive adaptive front lighting system for a vehicle with headlamps and a controller, the method including the steps of:
   Receiving a vehicle position;
   Identifying a map location of the vehicle;
   Determining a most likely path of the vehicle;
   Adaptively changing a distance between the vehicle and the target point;
   Calculating a desired swivel angle for the vehicle headlamps based on the most likely path of the vehicle; and
   Swiveling the headlamps according to the desired swivel angle, wherein the desired swivel angle is calculated such that the target point is at a first predefined distance to the center of a lane of the vehicle; wherein a nominal swivel angle of the headlamps is calculated such that the target point is at a second predefined distance to the center of the lane of the host vehicle; and wherein a maximum swivel angle of the headlamp is calculated such that no glare for oncoming traffic is created.

* * * * *